Figure 1:
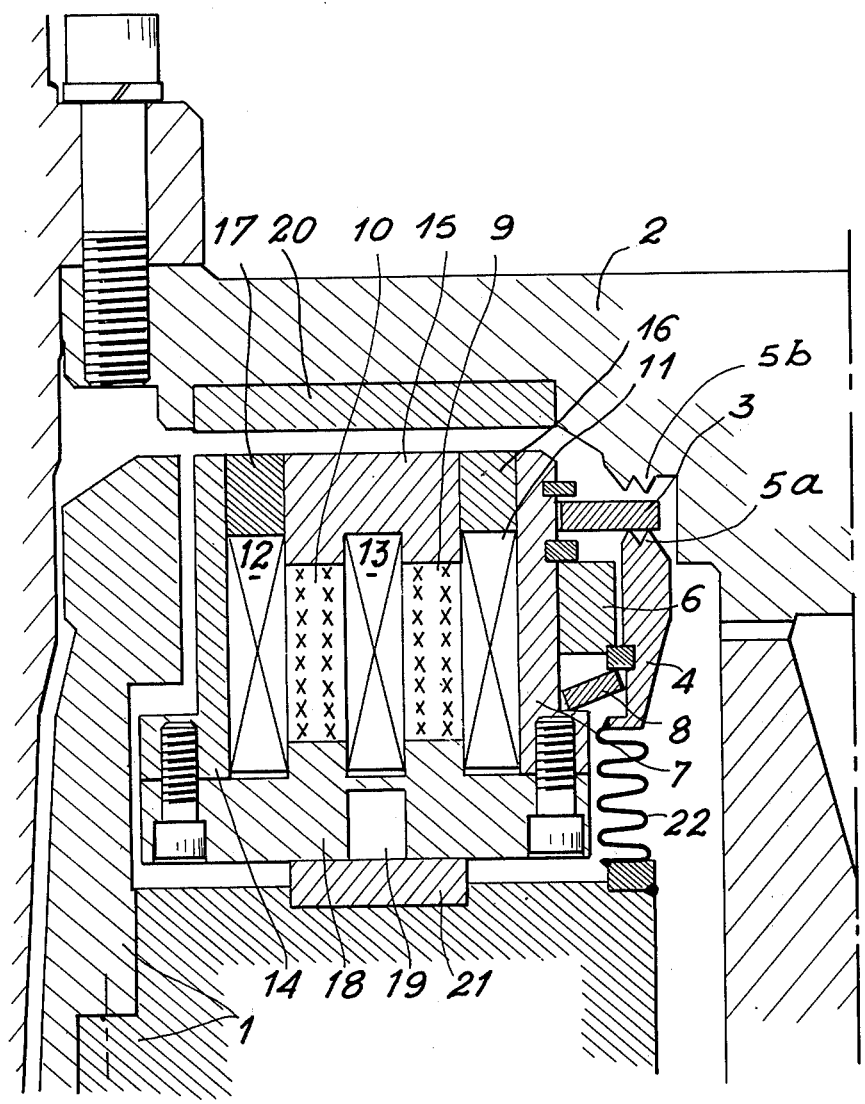

United States Patent [19]

Duquenne et al.

[11] 4,226,427
[45] Oct. 7, 1980

[54] MAGNETIC-CONTROL CLOSURE SYSTEM

[75] Inventors: Claude Duquenne, La Garenne; André Mondy, Asnieres, both of France

[73] Assignee: Societe Nationale d'Etude et de Construction de Moteurs d'Aviation (S.N.E.C.M.A.), Paris, France

[21] Appl. No.: 2,018

[22] Filed: Jan. 9, 1979

[30] Foreign Application Priority Data

Jan. 12, 1978 [FR] France ................... 78 01299

[51] Int. Cl.² .............................................. F16J 15/34
[52] U.S. Cl. .......................................... 277/80; 415/11
[58] Field of Search ......................... 415/111; 277/80

[56] References Cited

U.S. PATENT DOCUMENTS

| | | |
|---|---|---|
| 2,996,162 | 8/1961 | Lehde .................. 277/80 |
| 3,137,237 | 6/1964 | Zagar et al. ............ 277/80 |
| 3,931,976 | 1/1976 | Duquenne .............. 277/80 |
| 4,141,547 | 2/1979 | Duquenne .............. 277/80 |

Primary Examiner—Robert I. Smith
Attorney, Agent, or Firm—Kerkam, Stowell, Kondracki & Clarke

[57] ABSTRACT

The inner compartment of a compressor for noxious fluids is isolated by means of the closure system when the compressor is stationary and disengaged from its driving means. The closure system is controlled by a magnetic attraction system, the external surface of which is uniformly constructed of magnetic material having a small thickness at the level of non-magnetic elements. A particularly noteworthy application of the system is in motor-compressor sets for the transfer of toxic and hazardous fluids employed in the nuclear engineering field.

7 Claims, 4 Drawing Figures

MAGNETIC-CONTROL CLOSURE SYSTEM

This invention relates to a magnetic-control closure system for achieving leak-tightness between a driving element and a driven element connected together by separable coupling means and constitutes an improvement in the arrangements described in the U.S. Pat. No. 3,931,967 and in the U.S. Pat. Ser. No. 815,281, in which the driving element is the rotor of a compressor for special gases, particularly for toxic or hazardous gases.

In one design which is already known, a closure system of this type is constituted by an annular seal located in a plane at right angles to the axis of rotation of the motor. Said seal is clamped in the active position of closure between on the one hand stationary knife-edges formed on the rotor for this purpose and on the other hand movable knife-edges carried by a support member. Under the action of control means, said support member is capable of moving along the axis of the machine constituted by the driving element and driven element assembly, between an active position in which the support member is urged towards the rotor and an inactive position of closure in which said support member remains separated from this latter.

In the U.S. Pat. No. 3,931,976 there was proposed a closure control system in which the annular seal supporting member undergoes a displacement between the inactive position and the active position under the action of a magnetic attraction system. In particular and in accordance with the invention described in this patent, the movable knife-edges are connected to the movable support member by elastic means which exert a closure force in the direction of the stationary knife-edges, the value of said force being lower than the force of magnetic attraction.

In the inactive position of closure, the magnetic attraction system therefore rests under the action of its own weight on the frame of the driven element to which it is not locked. When the rotor is in motion, there is therefore a potential danger of accidental displacement of the attraction system and of the support member either as a result of vibrations or as a result of pressure differences on each side of the leak-tight packing mounted between the rotor and the casing of the machine, thus giving rise to accidental closure of the system.

In the U.S. Pat. Ser. No. 815,281 it has been proposed to overcome the disadvantage mentioned above. To this end, the magnetic attraction system employed for the displacement of the annular support member from the inactive position to the active position has a second stable state of attraction in which the support member is maintained at a distance from the rotor in the inactive position.

In accordance with a preferred embodiment, the magnetic attraction system cooperates in the inactive position of closure with a pole-piece which is rigidly fixed to the frame of the driven element.

For the practical application of the arrangement which has just been mentioned, it is an advantage to make use of the magnetic attraction means which have two stable states such as those described, for example in the French Pat. No. 76 14569 filed on May 14, 1976 by the company known as "Le Materiel Magnetique". These magnetic attraction means exhibit symmetry of revolution and have a double winding. One of the windings is constituted by two coils in series placed on each side of two annular permanent magnets and the other winding is constituted by a coil which is placed between the two magnets and has the design function of demagnetization and reversal of magnetization of one of the permanent magnets.

In a magnetic-control closure system of the type described in either of the two patents cited earlier, the external portion of the magnetic attraction system which can be coupled with the rotor is constituted by a plurality of concentric rings formed alternatively of magnetic material and of non-magnetic material. The rings of non-magnetic material provide both a mechanical coupling between the rings of magnetic material and leak-tightness of the magnetic attraction system. When a system of this type is employed in a noxious medium, it is usually provided with a protective coating. However, the presence of a number of rings of massive materials at the level of the top face makes it difficult to form welded joints and to deposit the protective coating.

The aim of the present invention is to overcome these disadvantages. To this end, the outer portion of the magnetic attraction system which can be coupled with the rotor under the action of magnetic attraction forces is formed of magnetic material whose thickness is reduced at the level of the rings of non-magnetic material so as to constitute a magnetic shunt having high reluctance opposite to each ring. As an advantageous feature, the non-magnetic material can accordingly be housed within a groove formed in the magnetic material opposite to each magnetic shunt. Each portion of magnetic material which constitutes a shunt can have a flat shape which is parallel to the external face of the magnetic attraction system. Said magnetic portion can also have a frusto-conical shape, thereby endowing it with a higher degree of mechanical strength. In one particularly advantageous form of construction, each portion which constitutes a magnetic shunt can be provided with a cylindrical shape having an axis which coincides with that of the magnetic attraction system. In the case just mentioned, the presence of the non-magnetic material is no longer indispensable.

As has already been stated in the foregoing, the present invention therefore makes it possible to provide suitable protection for the different components constituting the magnetic attraction systems described in the two patents cited earlier when such systems are employed in a deleterious environment.

Figure 2:
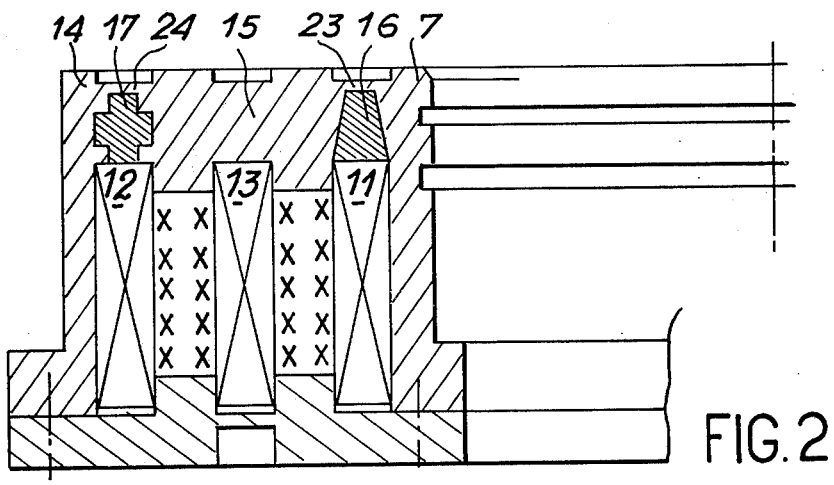
Figure 3:
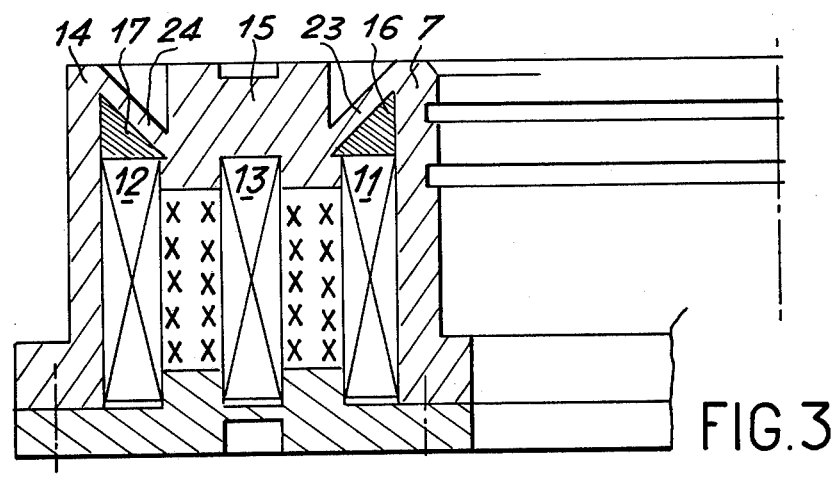
Figure 4:
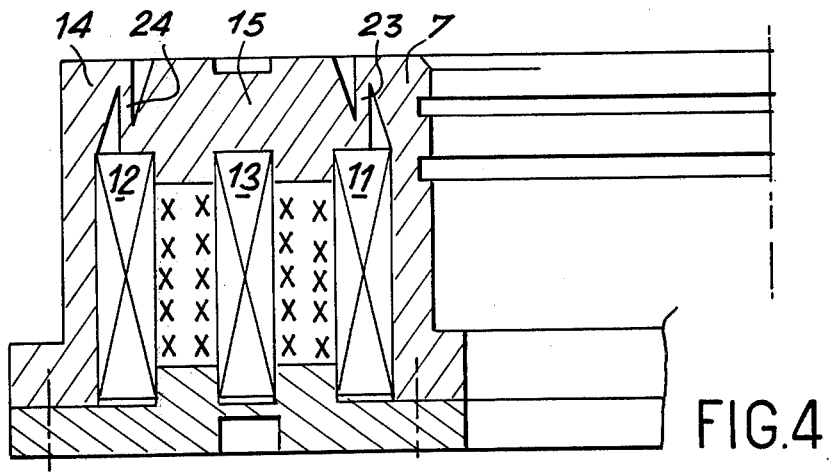

Different alternative embodiments of the invention will now be described by way of example and not in any limiting sense, reference being made to the accompanying drawings, wherein:

FIG. 1 is an axial half-sectional view of a magnetic-control closure system of the type described in the U.S. Pat. Ser. No. 815,281 and, FIGS. 2, 3 and 4 are fragmentary views representing different alternative forms of construction of the magnetic attraction system of the device which is illustrated in FIG. 1 and embodies the teachings of the present invention.

The closure system illustrated in the diagrammatic half-section of FIG. 1 is shown in the inactive position of closure. Leak-tightness between the frame 1 of the driven element and the rotor 2 is ensured by means of dynamic seals (not shown in the drawings). An annular seal 3 rests on knife-edges 5a carried by an annular support member 4 and remains at a distance from other knife-edges 5b which are integral with the rotor 2.

The annular support member 4 is capable of axial displacement with respect to the body of the magnetic attraction system. In the inactive position of closure, said support member 4 is abuttingly applied against a retaining ring 6 which is rigidly fixed to the inner body 7 of the attraction system, said member being maintained in this position by means of an elastic washer 8 which is applied against the body 7. The magnetic attraction system is constituted by a pair of concentric rings 9 and 10 of permanent magnets, said rings being placed between windings 11, 12, 13, and by an armature made up of several parts comprising in particular the inner body 7, an outer body 14 and an intermediate body 15 which are separated by non-magnetic elements 16 and 17 and a bottom portion 18 having a non-magnetic zone 19. The non-magnetic elements can be of stainless steel, for example. Two pole-pieces 20 and 21 are rigidly fixed to the rotor 2 and to the frame 1 respectively by suitable means.

In the inactive position of closure, the bottom portion 18 of the magnetic attraction system rests on the pole-piece 21 and is maintained stationary by the magnetic force of attraction in order to prevent any accidental displacement.

When the rotor is at a standstill, the magnetic attraction system can be actuated so as to be applied in contact with the pole-piece 20. The attractive force must be sufficient to overcome the force produced by the washer 8 which is compressed under the action of the displacement of the support member 4 which applies the seal 3 against the knife-edges of the rotor 2. In this active position of closure, the surrounding medium is isolated from the rotor compartment on the one hand by means of the seal 3 and on the other hand by means of a bellows seal 22 which connects the support member 4 to the frame 1.

It is worthy of note that the top outer portion of the magnetic attraction system shown in FIG. 1 is constituted by five concentric annular bodies 7, 16, 15, 17 and 14 which are welded to each other.

The use of this device in a deleterious medium and especially in the presence of uranium hexafluoride makes it essential to deposit a protective coating on the different components. This protective coating usually consists of a layer of nickel. From this point of view, the top outer portion of the magnetic attraction system gives rise to special difficulties by reason of the fact that the components of this portion are of different nature. In actual practice, it proves difficult to obtain good adhesion of a protective coating to different materials by means of a single process. Moreover, the fact that the materials work differently entails the need for difficult and costly welded joints between the rings.

The arrangement of FIG. 2 makes it possible to overcome these drawbacks. Thus the top outer face of the magnetic attraction system is so designed as to be wholly uniform. To this end, the bodies 7, 15 and 14 are joined together at the top outer portion of the magnetic attraction system by means of thin magnetic shunts 23 and 24 placed opposite to the elements 16 and 17 of non-magnetic material which are placed above the coils 11 and 12. This distinctive feature eliminates problems arising from deposition of the protective layer.

The unit of magnetic material constituted by the bodies 7, 14 and 15 and the shunts 23 and 24 can therefore be constructed in the form of a single part. Grooves can thus be formed in said part, the elements 16 and 17 of non-magnetic material being placed between said grooves by casting, for example. The shape of the grooves is not essential, the sole requirement being that it must ensure a good mechanical coupling between magnetic and non-magnetic materials. The shapes illustrated in this figure are shown only by way of example, the shape of the element 16 being better suited to a metallic compound whilst the shape of the element 17 is suitable for a chemical compound. In fact, the cast non-magnetic material can be a metal, a metal alloy or a chemical compound on condition that these materials have adequate mechanical characteristics. The use of a cast non-magnetic material makes it possible to form a mechanical coupling in accordance with a method of fabrication which is particularly economical.

The shape of the grooves defined in the unit of magnetic material at the level of the shunts 23 and 24 permits the application of an economical method of coating which consists in placing a premachined ring of non-magnetic material such as bronze within each groove and then melting this material in a vacuum furnace.

In the example of FIG. 2, the magnetic shunts 23 and 24 are disposed in a plane which is parallel to the top outer face of the magnetic attraction system. However, in order to obtain higher mechanical strength as well as decoupling of internal stresses, the device shown in FIG. 3 can advantageously be employed. In this arrangement, the magnetic shunts 23 and 24 have frusto-conical shapes. The non-magnetic material which constitutes the elements 16 and 17 is poured only into the inner grooves. The presence of this material is not mechanically justified within the outer grooves located above the shunts 23 and 24.

In the arrangement shown in FIG. 4, the magnetic shunts 23 and 24 are cylindrical and their axis coincides with that of the magnetic attraction system. Since the stresses to be carried by this part of the attraction system are essentially axial, the mechanical strength of the shunts 23 and 24 is sufficient and the use of cast elements of non-magnetic material is consequently unnecessary.

What we claim is:

1. A magnetic-control closure system for the rotor of a rotating machine which transports a noxious fluid, constituted by an annular seal located in a plane at right angles to the axis of rotation of the machine, said seal being clamped in the active position thereof between on the one hand stationary knife-edges formed on the rotor for this purpose and on the other hand movable knife-edges carried by an annular support member which is capable of moving along the axis of the machine, in which the movable support member moves under the action of a magnetic attraction system between an inactive position in which said member is separated from the rotor and an active position in which said member is coupled with said rotor under the action of magnetic attraction forces, the magnetic attraction system being such as to have an external portion defining a face which can be coupled with the rotor under the action of the magnetic attraction forces, wherein said external portion of the magnetic attraction system is uniformly constructed of magnetic material and comprises at least one annular portion of small thickness which defines a magnetic shunt having high reluctance.

2. A closure system according to claim 1, wherein said annular portion which defines a magnetic shunt is disposed in a plane parallel to that face of the external portion which is capable of being coupled with the rotor.

3. A closure system according to claim 1, wherein said annular portion which defines a magnetic shunt is of frusto-conical shape.

4. A closure system according to any one of claims 1 to 3, wherein the megnetic material forms at the level of the annular portion which defines a magnetic shunt a groove in which is placed a ring of non-magnetic material.

5. A closure system according to claim 4, wherein positioning of the ring of non-magnetic material is carried out by placing within the groove a premachined ring of non-magnetic material and by melting said ring within a vacuum furnace.

6. A closure system according to claim 1, wherein said annular portion which defines a magnetic shunt is cylindrical and wherein the axis of said portion coincides with the axis of the magnetic attraction system.

7. A magnetic-control closure system according to claim 1, substantially as hereinbefore described with reference to and as illustrated in the accompanying drawings.

* * * * *

UNITED STATES PATENT AND TRADEMARK OFFICE
CERTIFICATE OF CORRECTION

PATENT NO. : 4,226,427

DATED : October 7, 1980

INVENTOR(S) : Duquenne et al

It is certified that error appears in the above–identified patent and that said Letters Patent are hereby corrected as shown below:

On Title page

"[73] Assignee: Societe Nationale d'Etude et de Construction de Moteurs d'Aviation (S.N.E.C.M.A.), Paris, France"

should read:

-- [73] Assignee: Societe Nationale d'Etude et de Construction de Moteurs d'Aviation (S.N.E.C.M.A.), Paris, France, and Societe anonyme dite: Hispano-Suiza, Saint Cloud, France. --

Signed and Sealed this

Thirteenth Day of July 1982

[SEAL]

Attest:

Attesting Officer

GERALD J. MOSSINGHOFF

Commissioner of Patents and Trademarks